United States Patent [19]
Tonchen

[11] Patent Number: 4,466,642
[45] Date of Patent: Aug. 21, 1984

[54] PREFABRICATION METHOD AND PREFORMED BAND FOR USE IN COUPLING TUBULAR MEMBERS

[76] Inventor: Stephen Tonchen, c/o Able Metal Hose, Inc., 15 Laura Dr., Addison, Ill. 60101

[21] Appl. No.: 353,108

[22] Filed: Mar. 1, 1982

[51] Int. Cl.³ .............................................. F16L 21/00
[52] U.S. Cl. ................................... 285/419; 285/424; 29/445; 29/526 R
[58] Field of Search ......... 285/373, 419, 424, DIG. 4; 24/20 R, 23 R, 279; 29/445, 526

[56] References Cited

U.S. PATENT DOCUMENTS

| | | | |
|---|---|---|---|
| 2,116,165 | 5/1938 | Ullman | 285/419 X |
| 2,753,962 | 7/1956 | McBerty | 29/526 R |
| 3,944,265 | 3/1976 | Hiemstra | 285/419 |
| 4,312,526 | 1/1982 | Cassel | 285/419 |

FOREIGN PATENT DOCUMENTS 215670  4/1968  U.S.S.R. ............................. 285/419

*Primary Examiner*—Dave W. Arola
*Attorney, Agent, or Firm*—Neuman, Williams, Anderson & Olson

[57] ABSTRACT

Method and apparatus are disclosed for coupling of tubular members using a strip of metal which is preformed with an arcuate bend portion having a configuration and dimensions such as to allow the strip to be more easily wrapped around the members and tightened while obtaining a much tighter grip thereon.

10 Claims, 4 Drawing Figures

PREFABRICATION METHOD AND PREFORMED BAND FOR USE IN COUPLING TUBULAR MEMBERS

SUMMARY OF THE INVENTION

In one aspect, the present invention relates to a coupling for tubular members wherein a flat strip is preformed so as to enhance its coupling effectiveness when wrapped about the tubular members in the field, the preformed strip retaining a configuration such that it can be packaged in an essentially similar container as is presently widely used. This facilitates storage of the packaged preformed strips. It is conceived that a strip preformed according to the teachings herein, when applied to the tubular members, will have a more uniform tensile stress over its length and will provide a tighter grip on the tubular members than when a flat band is applied in the field, for any given amount of applied tightening force.

In another aspect of the invention, a flat strip may be preformed into an optimum or near-optimum configuration before application to tubular members; such preformed configurations result in a substantial increase in the strength of gripping forces securing the tubular members. In the ideal case, increased gripping by a factor of ten may be realized.

A feature of the invention resides in the provision of a preformed strip which accomodates a split gland ring. For the case of telescoping tubular members, the gland ring may be placed in encircling relation to the smaller diameter tubular member and against the end edge of the larger diameter member so as to effect a sealing of the joint between the tubular members as well as enhancing the gripping forces.

Further advantages and details of the invention are apparent from the following description of exemplary embodiments on the basis of the accompanying drawings, and other objects, features and advantages will be apparent from this detailed disclosure and from the appended claims. While the drawings illustrate exemplary full-feature embodiments, the invention is also directed to any part or parts of the illustrated embodiments.

DETAILED DESCRIPTION

Figure 1:
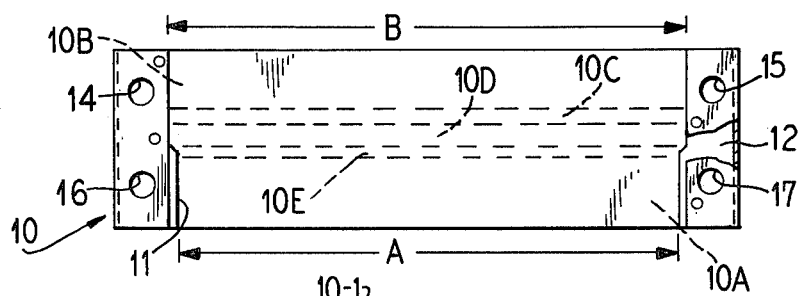
FIG. 1 is a diagramatic plan view of a conventional flat band which may be utilized for coupling tubular members having respective different diameters at a juncture therebetween; said figure also illustrating certain teachings and concepts of the present invention, any one or more of which can be applied by means of prefabricating steps to the flat band of FIG. 1.

FIG. 1 will serve to illustrate an example of a prior art flat band 10 which may be hand wrapped about telescoped tubular members, and then tightened by means of threaded fasteners so as to tend to conform the band to the peripheral surfaces of the tubular members. In a specific example, the band may be of Type 304 annealed soft (nonhardened) stainless steel having a thickness of 0.020 inch and a width of three inches. The strip stock of desired width and thickness may be obtained in a coiled form.

In a specific example of such a flat band for coupling of telescoped stainless steel tubular parts of an automotive exhaust system, the band 10 is provided with reinforcing bars 11 and 12 at the opposite ends such that the length A at one side of the strip is about one-fourth inch less than the length B at the other side of the strip. The strip ends may be wrapped about the bars 11 and 12, and welded thereto. The threaded fasteners may be accomodated by cooperating bolt holes 14,15 and 16,17 extending through the reinforcing bars 11 and 12. The holes 14-17 may be of diameter to snugly receive 7/16 inch diameter bolts serving as force means in conjunction with nuts and washers, for drawing the reinforcing bars toward each other, once the strip has been hand-formed about the tubular members.

Referring to FIG. 1, if the longitudinal portion of the band 10 with length A is to be wrapped about a tubular member with a circumference of a value greater than A some portion of the band (e.g. adjacent the apertured and welded end regions of the band) will be stretched by a substantial amount. If the central part of band 10 is considered to be at a six o'clock location while the reinforced ends have a gap therebetween centered at a twelve o'clock location (as indicated for a band 10-2 in FIG. 3) then it is considered that the length A of the band will not be uniformly stretched; rather tensile stress will be markedly concentrated at the end portions of the band nearest the twelve o'clock location (e.g. the end portions of the band between nine o'clock and twelve o'clock, and between twelve o'clock and three o'clock). A similar situation is considered to apply at the flat longitudinal portion of the band having the dimension B.

Applying lubricant to the surfaces of the tubular members in an effort to tend to equalize tension over the length of the band must be considered as disadvantageous. Further the application of high torques for tightening the nuts on the bolts also can only be considered a detriment to rapid and easy application of the band in the field. In a different prior art flat band, such lubricant is recommended when the band is applied to galvanized or rusty flexible tubing of an exhaust system which is being repaired, and torques of from fifty to seventy-five foot pounds are contemplated. This different prior art system does not provide close tolerances at the bolt holes as shown in FIG. 1 so that the reinforcing bars tilt toward each other at the radially outer edges during tightening of the nuts on the bolts. Since the reinforcing bars cannot be brought together at their radially inner adjacent edges as with the example of FIG. 1, a sealing gasket is provided in the package containing the flat band which sealing gasket is to be compressed between the reinforced ends of the band as the bolts are tightened. The flat band of FIG. 1 is commonly sold in a plastic package generally conforming in size to the band of FIG. 1, but with sufficient slack to accomodate a small plastic packet containing two 7/16 inch fine thread bolts, two washers and two nuts. The different flat band with the sealing gasket is commonly sold in a flat cardboard package with bolts, nuts, and washers and the length of sealant material, the package having dimensions of about 20 inches by 3¾ inches by one inch. The bolts furnished in the cardboard package for a five inch O.D. pipe have a length of thread about 2¼ inches and an overall length of about 2¾ inches.

Figure 2:
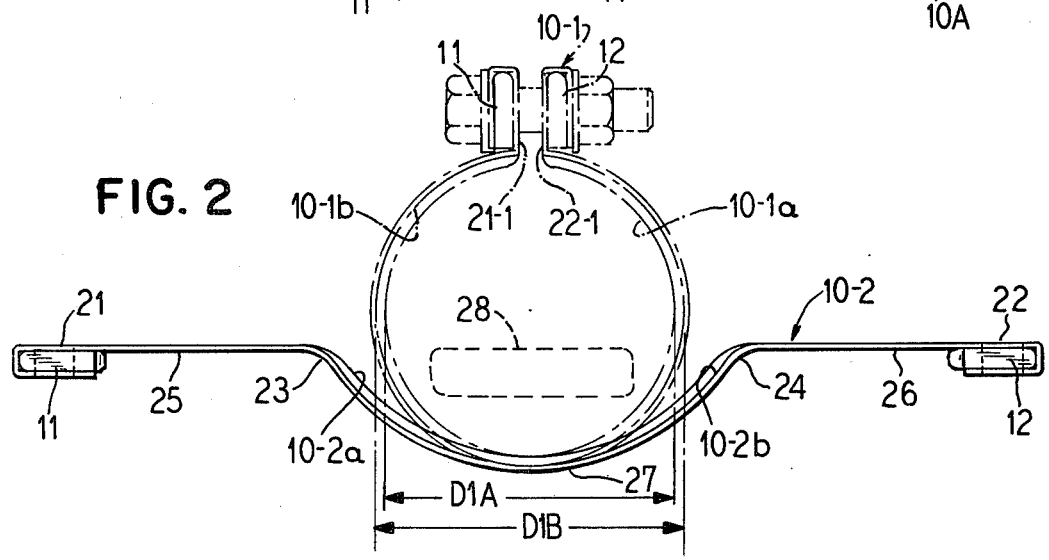
FIG. 2 is a somewhat diagramatic side elevational view of a pre-formed band which may be fabricated from the flat band of FIG. 1, FIG. 2 illustrating certain further teachings and concepts of the present invention by means of dotted lines added to the pre-formed band.
Figure 3:
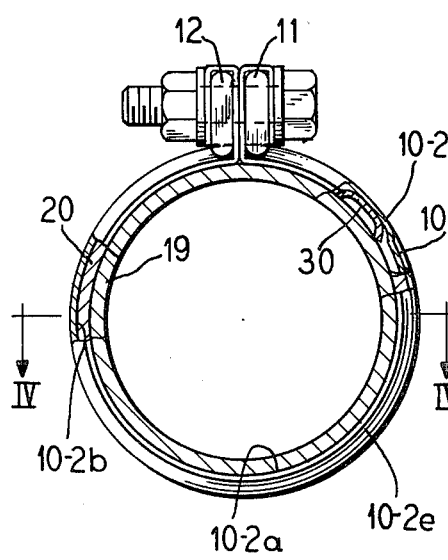
FIG. 3 is a somewhat diagramatic cross sectional view illustrating one preferred embodiment of the present invention, and showing the manner of application of the embodiment of FIG. 2 in the coupling of first and second tubular members having different outside diameters at the juncture therebetween, and illustrating the optional utilization of a split gland ring, the band being optionally prefabricated with an annular or semi-annular recess for locating the gland ring during application of the band to telescoping tubular members.
Figure 4:
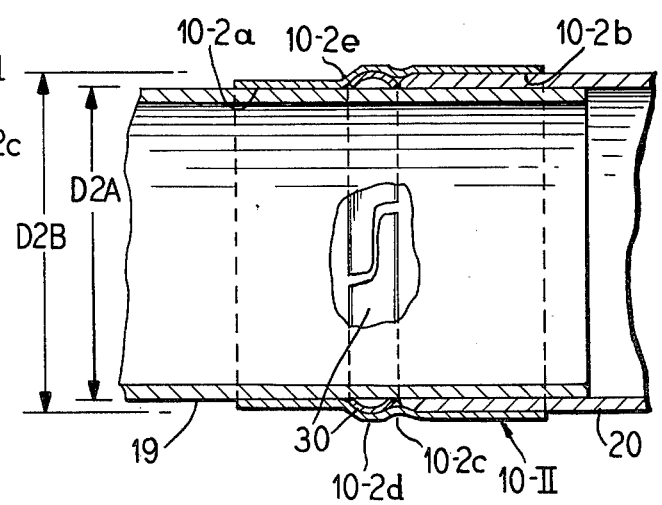
FIG. 4 is a somewhat diagramatic partial longitudinal sectional view taken generally along the line IV—IV of FIG. 3.

Referring to FIGS. 2, 3 and 4, it would be considered ideal if the band 10 could be preformed into a C configuration as indicated at 10-1, in FIG. 2, with preformed (or set) segmental cylindrical faces 10-1$a$ and 10-1$b$ of diameters D1A and D2B less than the respective outside diameters D2A and D2B of the telescoped tubular members 19 and 20 to be wrapped thereby. Taking account of preliminary stretching of the band 10 at its apertured and welded ends 21 and 22 and suitable tolerances in the dimensions and positioning of the bars 11 and 12, it would be convenient to have the arcuate distances corresponding to dimensions A and B of the preformed segmental cylindrical surfaces 10-1$a$ and 10-1$b$ such that when the band is placed about the tubular members 19 and 20 there is a separation or gap between the reinforced ends 21-1 and 22-1, FIG. 2, of the band 10 before tightening of the bolts, of about three-eighth inch. Thus for a diameter of six inches and a circumference of about 18.8 inches of a tubular member 19, if the reinforced ends are closed tightly together, the total stretch of such C-shaped band would be ⅜ inch or about two percent. This might correspond to a tensile stress of about forty thousand pounds per square inch if uniformly distributed about the length of the band. Such a nominal gap of ⅜ inch would insure an effective uniform stretching of the preformed band 10-1 of at least about two-tenths percent (in spite of tolerances and the like) corresponding to a tensile stress below the tensile yield strength (measured for a 0.2% permanent offset) of the material, but corresponding to a uniform tensile stress of the band 10-1 of at least about thirty thousand pounds per square inch.

An ideal preformed C-shaped band 10-1 made from the band 10 of FIG. 1 might have, as formed, an arcuate length (L1A) on the A side equal to the circumference (C2A) of the inner tubular member 19, FIGS. 3 and 4, less ⅜ inch, while, as formed, the arcuate length (L1B) on the B side would correspond to the circumference (C2B) of the larger diameter tubular member 20, less ⅜ inch. Where in FIG. 1, the B length exceeds the A length of the flat band by ¼ inch, corresponding to a larger tube diameter (D2B) greater than the smaller tube diameter (D2A) by ¼ inch, then the arcuate length of the preformed C-shaped band 10-1 on the B side would be $\pi/4$ inch longer than the arcuate length of the preformed C-shaped band 10-1 on the A side.

In order to retain the advantages of a flat package and convenient storage, the present invention provides a prefabricated band such as shown at 10-2 in FIG. 2. Ideally such preformed band 10-2 has segmental cylindrical surfaces 10-2$a$ and 10-2$b$ of diameters D1A and D1B as previously described. Also the band 10-2 has lengths along the inner surface (LA, LB) at the A and B sides which correspond with the corresponding lengths (L1A, L1B) described for the completely preformed band 10-1.

The band 10-2 has reversely curving connecting portions 23 and 24 and oppositely directed end portions 25 and 26 which extend in opposite directions from a central arcuate bend portion 27 which has the segmental cylindrical surfaces 10-2$a$ and 10-2$b$. The segmental cylindrical surfaces 10-2$a$ and 10-2$b$ are at least about one-fourth of the A and B side length dimensions (LA and LB, respectively) of the band 10-2 and may be about one-third of such length dimensions.

With the preformed band configuration 10-2, the overall lengths LOA and LOB measured in a straight line are reduced in comparison to distances A and B in FIG. 1 while the thickness dimensions overall HOA and HOB are less than one half of the ideal diametric values D1A and D1B. For a six inch value of D2B an ideal diametric value D1B would be less than six inches and HOB would be less than three inches. The spaces provided by the arcuate bend portion 27, in a plastic package conforming to the preformed band 10-2, would enable placing a packet of bolts, washers and nuts, indicated at 28, within the rectilinear space defined by the length LOB, the height HOB and the width of the band 10-2, e.g. three inches, for sizes of the band 10-2 corresponding to sizes of tube 19 of two inches through six inches, for example.

As indicated in FIG. 1, pursuant to the present invention, different portions of the flat band may be preformed to different lengths even in the essentially flat configuration. For example the longitudinal portion 10B of band 10 may be pressed upwardly out of the plane of the paper (where side 10A is assumed to be in the plane of the paper) so as to retain a preformed bowed configuration between bars 11 and 12 having a length (LBB) greater than length A of the flat longitudinal portion 10A, by $\pi/4$ inch, so that when such a type I band as so preformed is wrapped about tubular members 19 and 20, and the threaded fasteners tightened, the metal of portions 10A and 10B will be stretched by the same overall amount. Furthermore by forming the resultant preformed type I band about a mandrel with diameters D1A and D1B in the field, the preformed type I band can be converted into a nearly ideal band such as shown at 10-1 with the remaining gap between the ends as wrapped about members 19 and 20 less than ⅜ inch. Thus instead of attempting to lubricate the surface of an exhaust pipe to be repaired in the field, the type I band for example can be placed on a mandrel with ideal low friction surfaces of diameters D1A and D1B, and stretch formed by closing the reinforced ends completely together. If by so doing the type I band is uniformly stretched by two percent, then because of the well-known spring-back of ductile metal the attained diameters (DIA and DIB) will not be the ideal diameters D1A and D1B but the type I band will have been uniformly stressed toward the ideal configuration indicated at 10-1. Furthermore the gap remaining between the reinforced ends of the type I band as preset to circular configuration will have been reduced by the amount of residual stretch left by the mandrel-forming step. In this way, the gap to be closed during application of the type I band for coupling tubular members 19 and 20 can be one percent or less. By using a slightly oversize perimeter oval mandrel configuration, the central section of the type I band can be formed to mandrel semicylindrical surfaces having diameters D1A and D1B, while the type I band is left prestretched by a residual 1½ percent, leaving only a ½ percent or less stretching of the type I band when actually applied to tubular members 19 and 20.

For the type I band the bowed length portion 10B will have a transition region 10C at its inner margin which will provide a transition between the bowed portion 10B and the completely flat portion 10A.

In a type II pre-formed band according to FIG. 1, in addition to the bowed raised portion 10B, there is an intermediate bowed raised portion 10D which is raised relative to transition region 10C, so that the transition region 10C has a central portion with a length generally corresponding to the dimension A, but at the B side merging into the length of the portion 10B and at the A side again merging into a length corresponding to the length of portion 10B. At the A side of intermediate region 10D, there is a further transition region 10E which has a length at the B side thereof, generally corresponding to the length of the raised portion 10B and at the A thereof as a length substantially corresponding to the length dimension A in FIG. 1. Such a case II band when wrapped about the pipes 19 and 20 will have a configuration as illustrated in FIG. 4, the longitudinal portion 10A providing a portion such as indicated at 10-2a in FIG. 4 conforming with the diameter D2A, and the portion 10B providing an arcuate portion as indicated at 10-2b conforming with the outside circumference of pipe 20. The portion 10D provides a pocket as indicated at 10-2d in FIG. 4 for positioning a gland ring 30 in direct abutting engagement with the free end edge of pipe 20. The gland ring 30 is formed of a relatively hard steel material in comparison with the steel of the inner tubular member 19, and is preferably initially preformed on a diameter as indicated at D1A slightly less than the diameter D2A of the tubular member 19. The gland ring 30 has a circumferential extent at its radially inner edges less than the circumferential extent of the tubular member 19 by an amount such as ⅜ inch so that as the threaded fasteners are tightened to tighten a type II band or the band 10-2 of FIG. 4 about the tubular members 19 and 20, the gap in the gland ring will be reduced in size, and the adjacent edge of the gland ring 30 will be driven into tight sealing engagement with the adjoining end edge of the tubular member 20. At the same time, the region 10E of the type II band and the corresponding region 10-2e in FIG. 4 will be driven into interlocking relation to the gland ring 30, tending to prevent separation of the tube 20 and the band 10-II of FIG. 4 from the gland ring 30 which is in tight gripping relation to the inner tubular member 19. Thus, the gland ring 30 not only seals the joint between the tubular members but further tends to interlock the members against axial separation with a relatively low degree of applied force to the fastening means. In this way, the tubular members 19 and 20 can be coupled in sealing relation with a stretching of the material of the band 10-II of a relatively small amount such as two-tenths percent, such amount of tensioning being less than the tensile yield strength of the material of the band 10-II.

I claim as my invention:

1. A method for coupling first and second tubular members having first and second tubular end portions with nominal diameters which lie within a predetermined diametric range, and have respective actual circumferential extents not less than respective first and second minimum circumferential values (C2), (a) performing prefabricating steps on a strip of sheet metal having a length including a central section and opposite ends extending in opposite longitudinal directions from the central section, and having an original thickness (T) so as to be capable of being formed manually about the tubular members without the use of tools, the prefabricating steps comprising:

(a1) applying reinforcement to the opposite ends of the strip such that the opposite reinforced ends of the strip can be forced toward each other with the use of force means acting on the reinforced ends of the strip once the strip has been wrapped about the end portions of the tubular members, (a2) forming the central section of the length of the strip to provide an arcuately formed central section with segmental cylindrical interior surfaces at first and second longitudinal portions of the strip and forming said segmental cylindrical interior surfaces on first and second preformed diameters (D1) less than predetermined minimum diametric values (D2) corresponding to said first and second minimum circumferential values (C2), (a3) completing the prefabricating steps so as to provide a resultant prefabricated strip having an arcuately formed central section with said first and second segmental cylindrical interior surfaces providing at least about one-fourth of first and second length dimensions (LA, LB) of the first and second longitudinal portions of the resultant prefabricated strip at an interior side thereof, and with the reinforced ends of the resultant prefabricated strip extending in generally opposite directions from said formed central section, such that the overall length (LOA) of the resultant prefabricated strip between the reinforced ends is substantially less than the lesser of said first and second length dimensions (LOA<LA) and such that the prefabricated strip will fit within a rectangular cross section space with a height dimension (HOA) substantially less than the greater of said first and second preformed diameters (HOA<D1B), the first and second length dimensions (LA, LB) being less than the respective first and second minimum circumferential values (C2) by an amount not less than the original thickness dimension (T) of the strip, such that when the resultant prefabricated strip is manually wrapped about the first and second tubular end portions the reinforced ends of the strip will have a minimum gap length therebetween representing potential elongation of the first and second length portions which is not less than the original thickness dimension (T), (b) in the field, applying the resultant prefabricated sheet metal strip directly to the first and second tubular end portions of the first and second tubular members without interposition of any gasket material for coupling said tubular members together in axial alignment, by means of the following steps:

(b1) applying the first and second segmental cylindrical interior surfaces of the formed central section of the resultant prefabricated strip to the first and second tubular end portions of the first and second tubular members such than an intermediate longitudinal portion of the central section of the strip between the first and second segmental cylindrical interior surfaces extends in covering relation to the joint between the first and second tubular members, (b2) manually pressing the reinforced ends of the strip from their initial oppositely directed configuration toward each other so as to wrap the strip into conforming relation to further portions of the first and second tubular end portions and applying forcing means to the reinforced ends to bring the reinforced ends toward each other and thereby to bring the sheet metal of the strip into direct surface to surface contact with the first and second tubular end portions over the interior length of said first and second longitudinal portions of the strip between said reinforcing ends, and (b3) securing the reinforced ends in confronting relation with a spacial relationship therebetween such that the first and second longitudinal portions of the strip are held in a stretched condition corresponding to an elongation of the first and second longitudinal portions of the strip at least equal to the original thickness (T) of the sheet metal strip.

2. A method according to claim 1 with said first and second tubular members having equal nominal diameters and the forming of the central section of the length of the strip providing first and second segmental cylindrical interior surfaces of equal preformed diameter (D1) less than the predetermined minimum diametric value (D2) corresponding to the minimum circumferential value (C2) of said tubular end portions.

3. A method according to claim 1 with said first and second tubular end portions having nominal diameters which differ from each other by an amount greater than the original thickness (T) of the sheet metal.

4. A method according to claim 3 with the nominal diameters of the tubular end portions lying within about ten percent of each other, and the preformed diameters (DIA, D1B) of said first and second segmental cylindrical interior surfaces differing from each other at least by an amount equal to the original thickness dimension of the strip (T).

5. A method according to claim 1 with the completing of the prefabricating steps providing a resultant prefabricated strip having an arcuately formed central section with said first and second segmental cylindrical interior surfaces providing at least one-third of said first and second length dimensions of the first and second longitudinal portions of the resultant prefabricated strip at the interior side thereof.

6. A method according to claim 1 with the completing of the prefabricating steps providing a resultant prefabricated strip having first and second length dimensions differing by an amount substantially greater than one-quarter inch.

7. A method according to claim 1 with the completing of the prefabricating steps providing a resultant prefabricated strip having said first and second segmental cylindrical interior surfaces offset in a radial direction by a distance substantially equal to the wall thickness of said second tubular end portion.

8. A method according to claim 1 with the performing of the prefabricating steps being on a strip of sheet metal of annealed stainless steel having a thickness of about 0.020 inch.

9. A method according to claim 8 with the performing of the prefabricating steps being on a strip of annealed stainless steel having a width of about three inches.

10. An assemblage of parts useful for coupling first and second tubular members having first and second tubular end portions with nominal diameters which lie within a predetermined diametric range, and having respective actual circumferential extents not less than respective first and second minimum circumferential values, so as to secure the first and second tubular end portions in axially aligned relation with a joint therebetween, said assemblage comprising:

(a) a strip of sheet metal with reinforced ends, and (b) progressively adjustable force means for application to said reinforced ends when the strip is wrapped about the joint between said first and second tubular end portions so as to progressively tighten the strip about the joint, wherein the improvement comprises:

(c) said strip having a preformed arcuate bend therein intermediate the reinforced ends thereof providing first and second arcuate bend portions at opposite longitudinal sides of the strip and adapted to be placed in wrapping relation to portions of the circumference of said first and second tubular end portions, (d) the strip having first and second longitudinal portions extending longitudinally between the reinforced ends thereof and extending along the first and second arcuate bend portions with the length dimensions of the first and second longitudinal portions being less than the first and second minimum circumferential values, (e) the sheet metal of the strip providing generally oppositely extending end portions extending in generally opposite directions from said arcuate bend portion, and providing reversely curved connecting portions extending between the oppositely extending end portions and the arcuate bend portion with the curvature of the connecting portions being opposite to the curvature of the arcuate bend portion, and (f) the sheet metal of the oppositely extending end portions and of the reversely curved connecting portions being in a ductile hand-formable condition so that the strip can be wrapped by hand about the first and second tubular end portions, the force means being thereafter applied to the reinforced ends so as to progressively tighten the strip into a stretched conforming relationship to the first and second tubular end portions and with the first and second longitudinal portions of the strip firmly gripping respectively the first and second tubular end portions to secure said tubular end portions in said axially aligned relation.

* * * * *